(12) United States Patent
Jain

(10) Patent No.: US 12,433,684 B2
(45) Date of Patent: Oct. 7, 2025

(54) SURGICAL DRAINAGE APPARATUS AND METHODS OF USE

(71) Applicant: SUNCOAST ADVANCED SURGERY, PLLC, Lutz, FL (US)

(72) Inventor: Surbhi Jain, Lutz, FL (US)

(73) Assignee: SUNCOAST ADVANCED SURGERY, PLLC, Lutz, FL (US)

( * ) Notice: Subject to any disclaimer, the term of this patent is extended or adjusted under 35 U.S.C. 154(b) by 346 days.

(21) Appl. No.: 17/940,943

(22) Filed: Sep. 8, 2022

(65) Prior Publication Data

US 2023/0080646 A1 Mar. 16, 2023

Related U.S. Application Data

(60) Provisional application No. 63/242,591, filed on Sep. 10, 2021.

(51) Int. Cl.
  *A61B 34/20* (2016.01)
  *A61B 90/00* (2016.01)

(52) U.S. Cl.
  CPC ............. *A61B 34/20* (2016.02); *A61B 90/36* (2016.02); *A61B 2090/364* (2016.02)

(58) Field of Classification Search
  CPC ... A61B 34/20; A61B 90/36; A61B 2090/364; A61B 90/361; A61B 1/00131; A61B 2090/309; A61B 2090/3614; A61B 2090/378; A61M 25/0026; A61M 27/00
  See application file for complete search history.

(56) References Cited

U.S. PATENT DOCUMENTS

| | | | |
|---|---|---|---|
| 5,545,169 A | * | 8/1996 | Yarger .................. A61B 46/10 606/108 |
| 8,211,128 B1 | * | 7/2012 | Facundus ............. A61B 17/115 604/35 |
| 9,649,415 B2 | | 5/2017 | Lazarus |
| 9,775,496 B2 | | 10/2017 | Reydel |
| 10,765,847 B1 | | 9/2020 | Al-Jazaeri et al. |

(Continued)

FOREIGN PATENT DOCUMENTS

WO 2015035354 A1 3/2015

OTHER PUBLICATIONS

Endo et al., Usefulness of Double-Balloon Endoscopy in the Post-operative Gastrointestinal Tract. Gastroenterology Research and Practice, vol. 2011, Dec. 11, 2011, 429462 [online], [retrieved on Dec. 12, 2022]. <URL: https://www.ncbi.nlm.nih.gov/pmc/articles/PMC3238371/><DOI: 10.1155/2011/429462>.

(Continued)

*Primary Examiner* — Baisakhi Roy
(74) *Attorney, Agent, or Firm* — Quarles & Brady, LLP

(57) ABSTRACT

A surgical drain for monitoring an internal site in a patient. The surgical drain can include an outer flexible tube, a first tube, and a second tube. The outer flexible tube can include a plurality of ports extending from a proximal end to a distal patient end. The first tube can be inserted within the first port, having at least one lumen side extending therethrough in fluid communication with a collection device. The first tube is configured to drain fluid from an internal site in the patient to the collection device. The second tube can extend through a second port having a camera at the distal patient end of the second tube.

21 Claims, 17 Drawing Sheets

(56) References Cited

U.S. PATENT DOCUMENTS

| | | | |
|---|---|---|---|
| 2005/0171470 A1 | 8/2005 | Kucklick et al. | |
| 2009/0124999 A1* | 5/2009 | Horton | A61M 25/007 604/99.04 |
| 2009/0326462 A1* | 12/2009 | Wingardner, III | A61B 17/3421 604/164.09 |
| 2012/0143029 A1* | 6/2012 | Silverstein | A61B 8/0891 600/374 |
| 2016/0270865 A1 | 9/2016 | Landey et al. | |
| 2018/0133445 A1* | 5/2018 | Durrani | A61M 25/003 |
| 2019/0090750 A1* | 3/2019 | Bradbury | A61B 5/743 |
| 2019/0201230 A1* | 7/2019 | Aravalli | A61F 5/449 |
| 2020/0038563 A1* | 2/2020 | Boyle, Jr. | B65H 75/406 |
| 2020/0046213 A1* | 2/2020 | Bendory | A61B 1/05 |
| 2021/0322735 A1* | 10/2021 | Goldberg | A61M 1/87 |
| 2024/0189496 A1* | 6/2024 | Zevallos | A61M 1/60 |

OTHER PUBLICATIONS

International Search Report and Written Opinion issued in corresponding PCT Application No. PCT/US2022/042950, Issued Jan. 6, 2023.

* cited by examiner

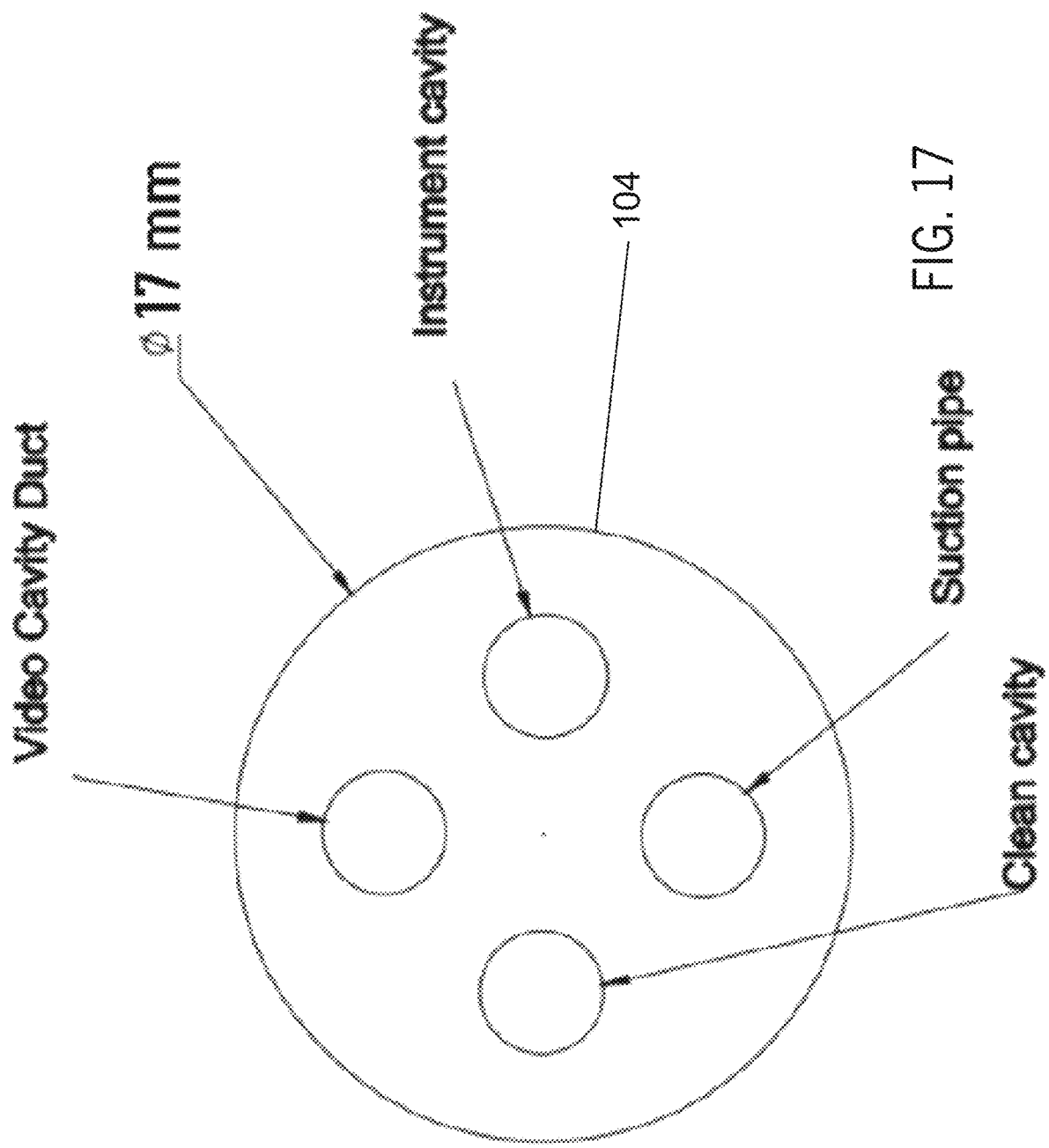

SURGICAL DRAINAGE APPARATUS AND METHODS OF USE

CROSS-REFERENCE TO RELATED APPLICATIONS

The present application is based on and claims priority from U.S. patent application Ser. No. 63/242,591, filed on Sep. 10, 2021, the entire disclosure of which is incorporated herein by reference

STATEMENT REGARDING FEDERALLY SPONSORED RESEARCH OR DEVELOPMENT

Not applicable.

FIELD OF THE INVENTION

Some embodiments provided herein are generally related to a percutaneous surgical drainage device for use in a patient to aid in post-surgical monitoring of the surgical site and for use in interventional radiology for diagnostic and therapeutic purposes.

BACKGROUND

Complications are inherent in surgery. Identification of surgical complications early can help decrease morbidity and mortality. It is crucial not only to learn proper indications and techniques of surgery but even more important is identifying and treating surgical complications. Clinical observation, of course, remains the mainstay for the identification of difficulties. Laboratory studies and CT scan other imaging diagnosis have been a standard performance to evaluate a patient in post-operative distress. Reliance on change in laboratory values, imaging, or significant clinical change, which could be worth days of delay easily. Various clinical scoring systems developed in predicting early complications but helps only modest at best.

Current assessment methodology includes clinical, laboratory, and imaging techniques, which are all indirect assessment, and, it may not be precise and has various confounding variables. It is paramount importance in getting knowledge about complications such as bleeding, abscess, and leakage early on. In the current standards of surgical practice, there is a lack of bedside diagnostic and interventional tool, which can not only detect acute changes but also has the capability of performing corrective bedside interventions. Due to limitations of currently available indirect assessment methods and insufficient information provided in surgery can carry a higher morbidity and mortality rates, for direct assessment, patients may need to return to the operating room or are fraught with high morbidity due to the consequences of delayed evaluation.

Thus, there is a need for straightforward visual assessment methodology such as intra-abdominal assessment at bedside.

SUMMARY

Some embodiments provide a surgical drain for monitoring an internal site in a patient. The surgical drain can include an outer flexible tube, a first tube, and a second tube. The outer flexible tube can include a plurality of ports extending from a proximal end to a distal patient end. The first tube can be inserted within the first port, having at least one lumen side extending therethrough in fluid communication with a collection device. The first tube can be capable of draining fluid from an internal site in the patient to the collection device. The second tube can extend through a second port having a camera at the distal patient end of the second tube. Typically, surgical drains in the art are single tube connected to a device for drainage, as opposed to the present invention in which the drain contains two or more lumens (2, 3, 4 or more lumens) connected to the drainage device.

Thus one embodiment provides a surgical drain for monitoring an internal site in a patient including: an outer flexible tube including a plurality of ports extending from a proximal end to a distal patient end; a first tube within a first port of the plurality of ports, the first tube having at least one lumen side extending therethrough in fluid communication with a collection device, the first tube being configured to drain fluid from an internal site in the patient to the collection device; and a second tube extending through a second port of the plurality of ports, the second tube having a camera at the distal patient end of the second tube.

Another embodiment provides a method for post-operatively inspecting an internal surgical site, including: inserting an outer flexible tube into a body of a subject, the outer flexible tube including a plurality of ports extending from a proximal end of the outer flexible tube to a distal end of the outer flexible tube; inserting a first tube into a first port of the plurality of ports, the first tube having at least one lumen side extending therethrough in fluid communication with a collection device, the first tube being configured to drain fluid from an internal site in the patient to the collection device; and inserting a second tube into a second port of the plurality of ports, a distal end of the second tube comprising a camera attached thereto.

Additional objectives, advantages and novel features will be set forth in the description which follows or will become apparent to those skilled in the art upon examination of the drawings and detailed description which follows.

BRIEF DESCRIPTION OF THE DRAWINGS

FIG. 17 illustrates a construction of the outer flexible tube for use with the surgical drain device according to one embodiment.

Corresponding reference characters indicate corresponding elements among the view of the drawings. The headings used in the figures should not be interpreted to limit the scope of the claims.

DETAILED DESCRIPTION

Figure 1:
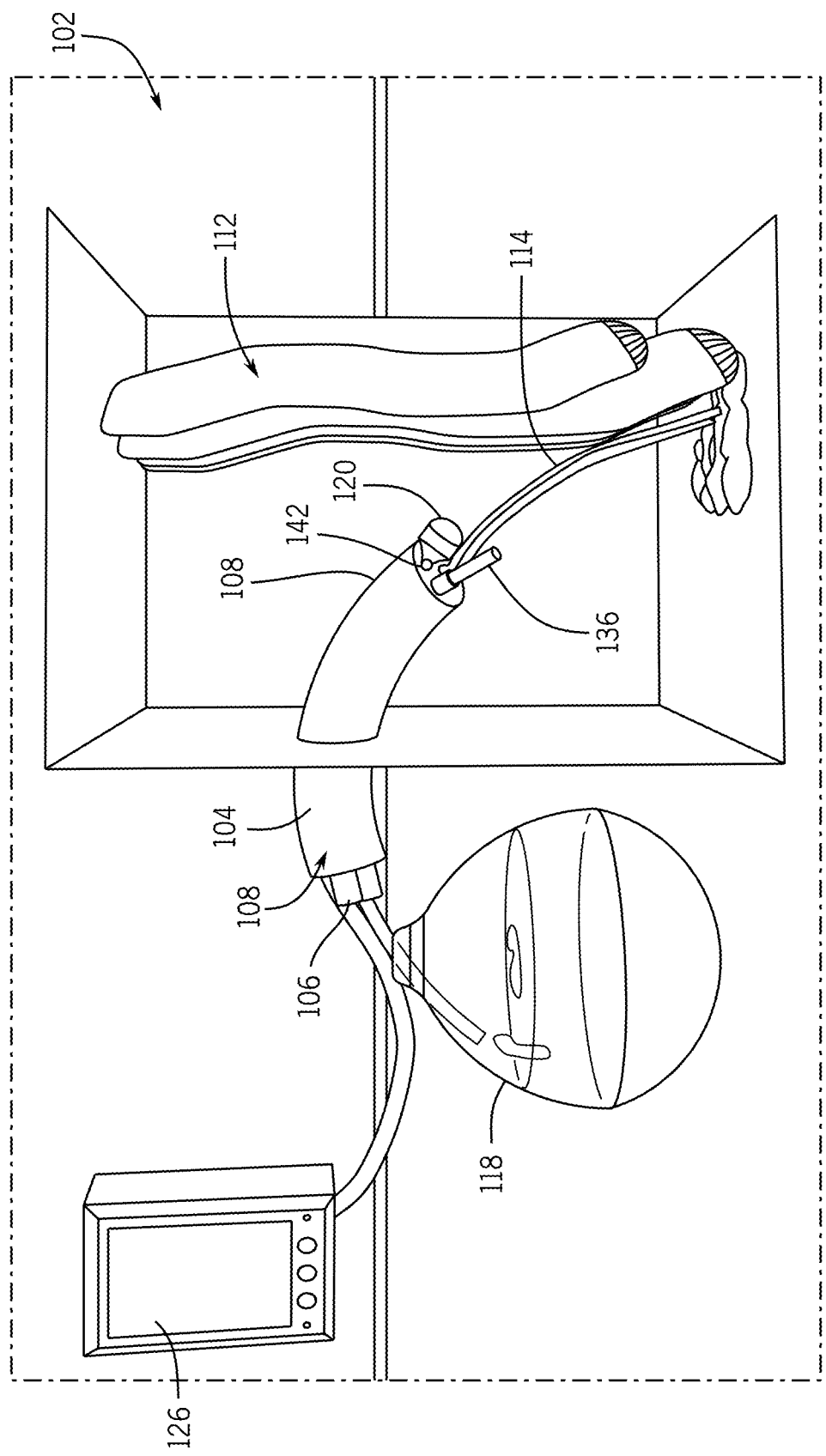
FIG. 1 illustrates a perspective view of the surgical drain device according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

Disclosed herein is a surgical drain device and method for monitoring a surgical site in a patient after surgery or even for diagnostic and therapeutic purposes by interventional radiology methods. Generally, the surgical drain device may be used to drain fluids at a surgical site after surgery, and to monitor the surgical site with real-time visuals of the site. The surgical site is the location of a surgery on the patient. For example, in some embodiments the surgery can be an abdominal surgery; in other embodiments the surgery can be surgery on any other tissue or organ including the brain, lung, heart, or other tissue. In addition, the surgical drain device may be used to monitor an internal site on a patient in real time by accessing the internal site through a small incision, for example, to monitor an old surgical site, a wound site or other internal site needing monitoring for symptoms, for example, a site with possible internal bleeding, abscess, or intestinal leakage, among others.

Generally, the device of some embodiments can be an imaging integrated surgical drain device design to access the surgical site of a patient. The device can be placed into the patient during the surgery for which the site is being monitored, or through interventional radiology techniques. Placing the surgical drain device for post-surgical monitoring of the surgical site allows for additional monitoring of the surgical device and for treating any complications quickly, e.g. by administering a drug or by performing a procedure to address any complication that arises.

Post-surgical complications are common in all surgical procedures. It is essential for medical professionals to monitor the surgical site to ensure that there are no major obstacles with the recovery process. No straightforward visual intraabdominal assessment methodology at bedside currently exists. Therefore, the urgency of being able to quickly identify and treat potential complications occupies healthcare providers during post-surgical care. Current methods include imaging methods such as x-ray and MRI scans to visualize the site of the complication. However, current imaging methods are time consuming and do not offer real-time monitoring of the site. Accordingly, embodiments of the surgical drain device, as illustrated in the figures, can be configured for use in post-surgical drainage monitoring while also providing the means to treat or fix any complications that arise. The drain surgical device provides the advantage of real time monitoring, allowing for complications to be detected early and allowing for treatment, including bedside treatment of the complications before they become life threatening. Prior procedures required blood testing and time-consuming imaging techniques to monitor for post-surgery complications. The present invention provides an inexpensive, real-time method of monitoring an internal site post-surgery so that complications can be detected and addressed before causing major symptoms and life-threatening complications.

The device can control unwanted post-surgical dehiscence, bleeding, infection and leaks by addressing them immediately. Other instances that the device can aid in treating complications by implementing a variety of techniques which include, but not limited to, delivering medications, taking samples, resuscitative fluid, repairing wounds and surgical site openings, among others. Further examples of other instances the device can aid in includes stopping or reducing bleeding, repairing fistulas, aid in monitoring and detecting the return of peristalsis in the intestinal system, local drug therapy delivery including chemotherapy and immunotherapy (for example at lower dosages due to local delivery), foreign body removal, among others. These are some methods medical professionals use to treat post-surgical complications. The present invention allow for real time, faster and easier identification of complications, and also provides a port for remedying a number of complications with the surgical drain device.

It should be appreciated that the surgical draining device can be a self-contained system and, in some embodiments, configured to be applied to surgeries other than abdominal surgery. For example, the device can also be used for neurosurgery, thoracic, breast, and vascular surgery. It should be appreciated that the size and shape of the surgical drainage device can be altered to meet the needs of the particular type of surgery, as mentioned above. The ability of the surgical drainage device to evaluate complications such as bleeding, abscess, infections, and leak almost immediately, so the treatment is undertaken right away. The surgical drain device removes the guesswork required in the current system evaluation such as laboratory values and labor-intensive imaging as it provides direct evaluation at the bedside.

Figure 2:
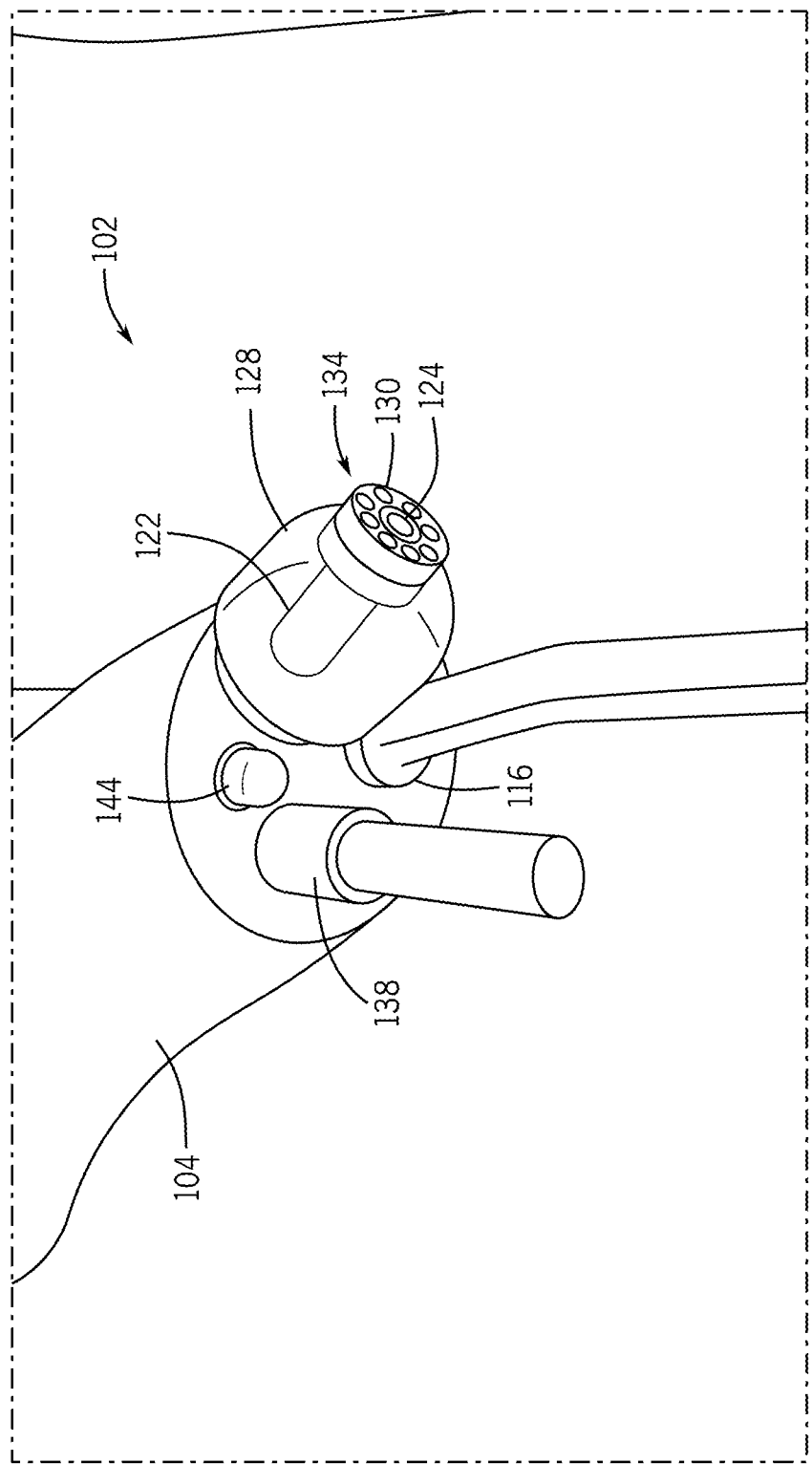
FIG. 2 illustrates a front perspective view of the surgical drain device according to one embodiment.

Referring now to the Figures, and more particularly to FIGS. 1-5, a surgical drain device 102 for monitoring an internal site 112 in a patient according to some embodiments is illustrated. The surgical drain 102 can be disposed after each use in a single patient to avoid risk of cross-contamination. As shown in FIGS. 1 and 2, the surgical drain 102 includes an outer flexible tube 104 with a plurality of ports 106 extending form a proximal end 108 to a distal patient end 110. The surgical drain 102 may contain open or more tubes through one or more of the plurality of ports 106. In one embodiment, the surgical drain 102 includes at least a first tube 114 and a second tube 120. The surgical drain 102 may also include a first tube 114, a second tube 120, a third tube 136, and a fourth tube 142, each configured to aid in treating the internal site 112 of the patient. Each of the first tube 114, the second tube 120, the third tube 136, and the fourth tube 142 are flexible and elastically deformable. The flexibility of each of the tubes allows for additional maneuverability of the tubes. The tubes can be round but other shapes are contemplated, including ovals, triangular, square, sheets, rectangular and irregular shapes. Further, tubes may be made of any medical grade tubing, including plastic or rubber are contemplated for use, including polyethylene, polypropylene, polyurethane, fluoropolymer, latex, nylon, PVC, silicone, rubber, tubing, among others. Medical grade plastics for tubing are known in the art are commercially available (e.g., Tygon tubing).

The first tube 114 within the first port 116 can have at least one lumen side extending therethrough in fluid communication with a collection device 118. The first tube can be a hollow tube allowing fluid to flow within the tube. The first tube is capable of draining fluid from an internal site in the patient to the collection device 118; the end of the first tube opposite the collection device 118 may be coupled to a drainage catheter 119, which can be provided in various shapes such as a leaf shape (see FIG. 7). The first tube can be a typical drainage tube used in standard surgical drains. For example, the tube can be a silicone tube that provide easy activation of suction. Suitable sizes of surgical tubes include tubes with a diameter from about 5 mm to about 40 mm, and sizes in between, including about 10 mm to 40 mm, could be bigger and smaller depending on the type of system and area required. The collection device can be a bulb, a collection bag, container, or a drainage reservoir. The collection device can also include graduations to allow medical professionals monitoring the drainage. The graduations make it easy to identify and measure the volume and observe the contents of the drainage that occurs. The collection device should be easily emptied and reattached. The collection device may also be disposable and can be swapped for a sterile collection device once filled to capacity.

In some examples, the inner lumens of the drainage system is made of non-reactive, non-irritant plastics, for example, silicone, PVC, and the like. In some examples, the outer drain is an irritant-type drain, for example, made of latex, plastic, rubber, and the like. One skilled in the art would be able to select the type of material to use for the drainage system based on the usage of the system.

The second tube 120 extending through a second port 122 can have a camera 124 at the distal patient end 110 of the second tube 120. The camera 124 can be in communication with a display 126. The camera is capable of real-time monitoring of the internal site of the patient. The camera can be a micro-camera or a fiber-optic camera configured to be inserted into a body and provide a visual of the location inside the body where the camera is inserted. Specifically, the camera can be high-quality video camera technology such as those used in cellphones. The camera's communication with the display can be connected wirelessly or with a wire. The wire can be run through the second tube 120 to connect the camera to the display 126. The display 126 can be configured to depict the image from the camera 124 as it is moved around within the internal site. The images from the camera may be broadcast locally or may be transmitted via an internet connection to a remote site to be monitored. The camera can transmit images via wireless network to a station in which the images can be monitored by a medical professional. The camera 124 may be covered with a clear plastic or silicone coating or sleeve to protect the components of the camera 124 and/or to maintain sterility of the tissue into which the camera probe is inserted. In some embodiments, the camera 124 may be inserted within an inflatable balloon (see below) to further maintain sterility and protect the components of the camera 124.

In some embodiments, the camera and display sub-system can also be replaced with an ultrasonography system that is attached to the second tube 120. The ultrasound probe can be attached to the end of the second tube. The probe can be connected to a display that shows an ultrasound image of the surgical site. Since ultrasound is often used as a diagnostic tool, the ultrasonography system allows for assessment of the surgical site. As mentioned above, the second tube 120 provides another means for assessing potential post-surgical complications.

Figure 5:
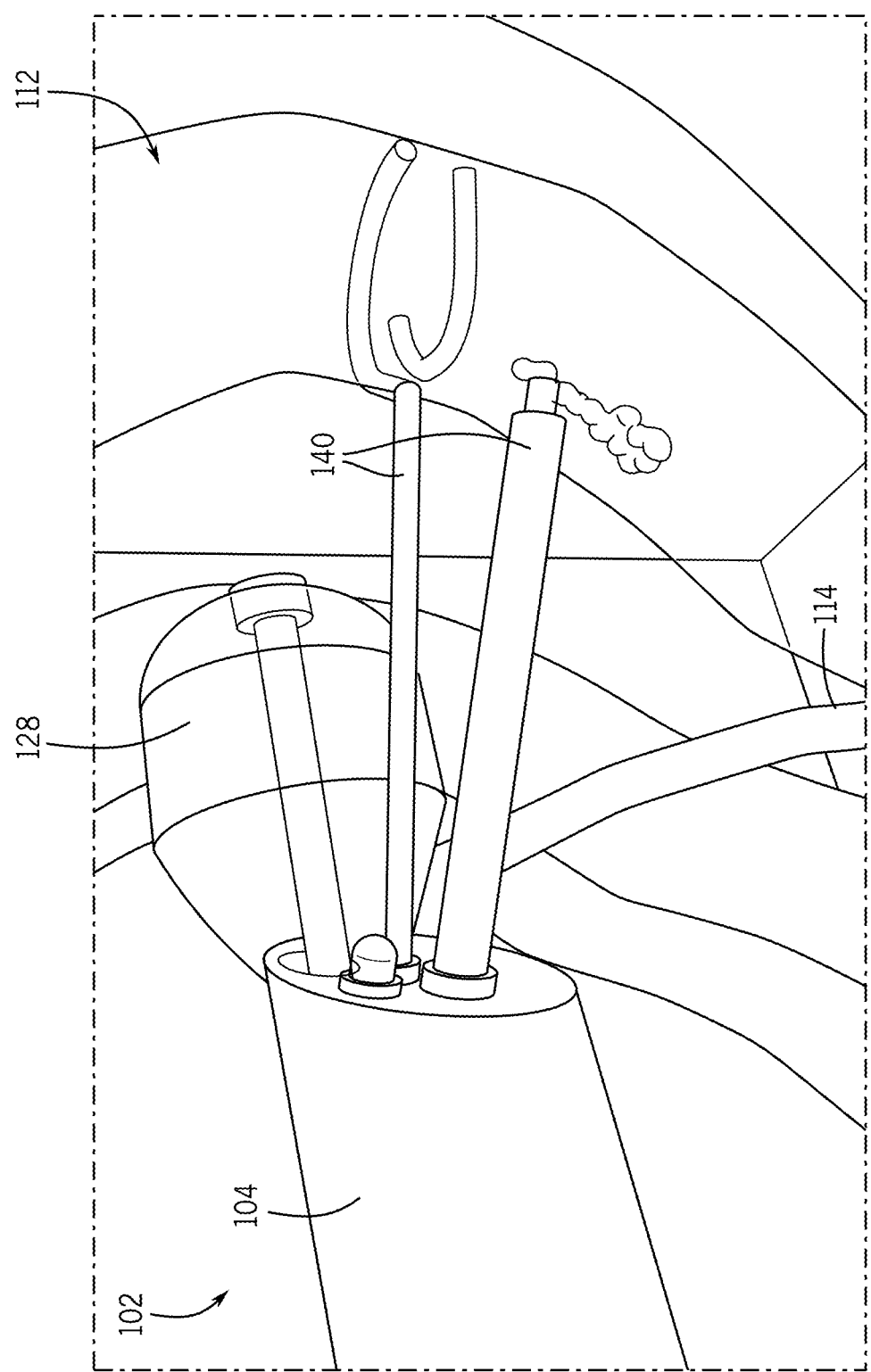
FIG. 5 illustrates a side perspective view of the surgical drain device according to one embodiment.

The camera 124 can also be configured to rotate at an angle (e.g. up to 270°) relative to a central axis 132 of the second tube 120, allowing the camera to capture images from all angles at the internal site, as shown in FIG. 5. The additional maneuverability of the camera allows medical professionals to visualize intraabdominal organs for various pathology and assess other issues for complications, such as dehiscence, bleeding and abscess. These post-surgery issues can have a devastating course if not detected early and treatment initiated. Thus, the combination of the camera and display presents medical professionals the ability to monitor the surgical site in real-time. The information presented by the display is faster than taking images with current imaging methods of CT and MRI, allowing post-surgical complications such as bleeding or intestinal, pancreatic or biliary leaks to be treated quickly and before they become life threatening.

Figure 3:
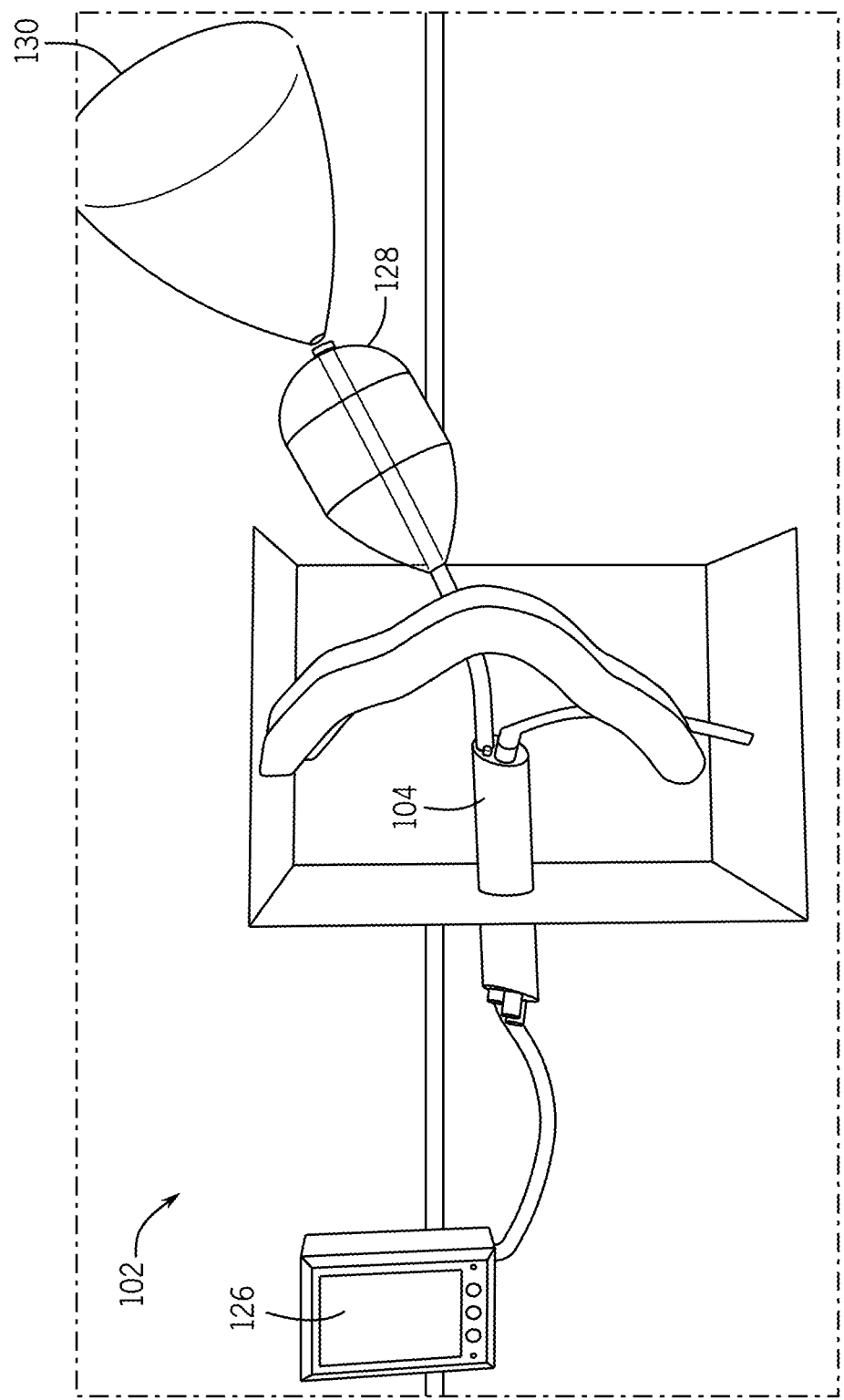
FIG. 3 illustrates a side perspective view of the surgical drain device according to one embodiment.
Figure 4:
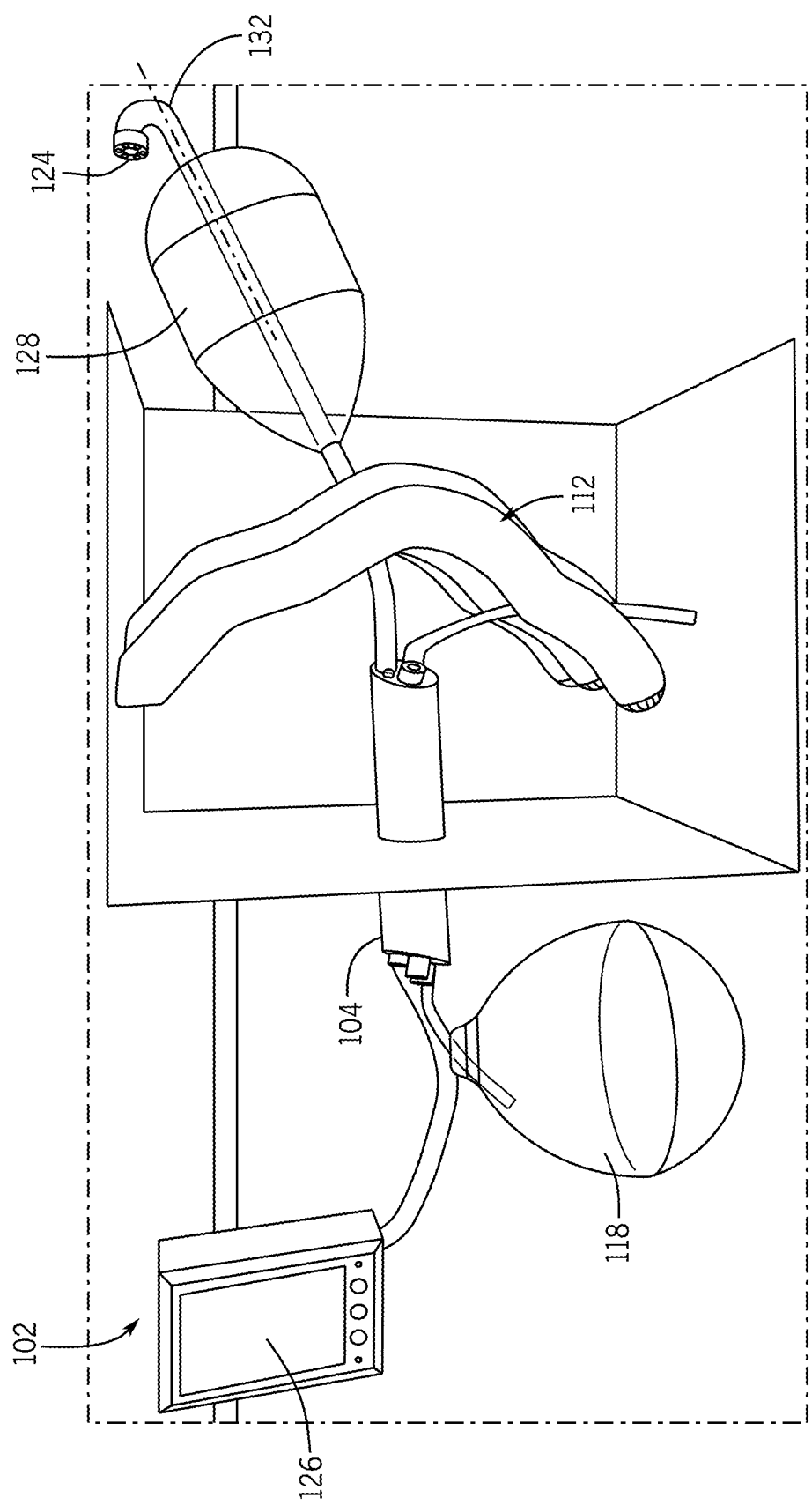
FIG. 4 illustrates a side perspective view of the surgical drain device according to one embodiment.

Because of the several bowel loops inside a human abdomen, it could be difficult to visualize. Therefore, the second tube 120 can also be a hollow tube connected to a balloon 128, where the hollow tube allows for air to flow through the tube into the balloon to inflate/deflate the balloon 128. As shown in FIG. 3, the air can inflate a balloon 128 at a distal end 134 of the second tube 120. The balloon 128 can be located proximal to the camera 124 on the second tube 120 or the camera 124 may be disposed within the balloon 128. The balloon 128 can be a silicone or inert plastic deflated balloon. The balloon can be expanded once near the internal site through the second tube with water or air through a secure sterile attachment. The balloon may be able to be inflated with air, water, or a combination thereof. The amount of inflation will depend on the area to be imaged and the need to maneuver internal organs to clear an area in order to image the internal site. In some examples, the balloon may be filled with water. In other examples, the balloon may be filed with air. For example, the sterile attachment can be a syringe that is configured to be attached to the second tube. The syringe can create an insufflation of saline or water to create a sterile compartment hydroperitoneum balloon to maneuver the flexible camera. The camera can be advanced through the second tube to visualize organs and other pathology at the surgical site. In order to accommodate both the camera and the balloon, the second tube can be a compartmentalized tube to separate the fluid or air in communication with the syringe to the surgical site required for the balloon inflation and the connection from the display to the camera.

In addition to the balloon, the camera may also require further illumination in the surgical site to add clarity to the visual image shown on the display. The second tube 120 can include a light source 130 at a distal end 134 of the second tube 120 in addition to the camera 124, illustrated in FIG. 3. The light 130 illuminates at the surgical site to provide additional visualization and a clear image on the display. Further, the light source provides illumination to maneuver the camera 124 around the surgical site while looking for potential causes of post-surgical complications. The complete sub-system of the second tube, including all its attachments, gives direct visualization of pathology and removes the assumption involved in current methods such as imaging with CT and MRI scans. The camera used are less expensive than the fiber-optic cameras used in laparoscopic surgeries, allowing for single-use application of the device.

The second tube 120 and its attachments aids medical professionals in visualizing and identifying potential complication, while an additional third tube can aid in treating these complications. Specifically, looking at FIG. 4, the third tube 136 can extend through a third port 138 capable of transporting a surgical tool 140 or medicine to the distal patient end 110 at the internal site 112 of the patient. The surgical tool can be capable of passing through the third tube. The surgical tool can repair leaks within the tissue area of the body at the internal site, for example by use of surgical grade super glue, clips or laparoscopic instrument to suture closed the wound opening. With assistance of the images from the camera attached to the second tube, the surgical tool can be guided through the surgical site to treat potential complications identified.

The surgical tool can be a variety of tools to accommodate the various types of complications that can occur post-surgery. Therefore, the surgical tool can be various types of tools to treat the complication such as, but not limited to, excess bleeding, dehiscence, abscess, and leaks. For example, the surgical tools can be an arthroscopic tool, cauterization tool, biopsy tool, a heat probe, or suture probes. Other examples of surgical tools include T-tube, percutaneous nephrolithotomy instruments, among others. The surgical tool can also be configured to transport magnetic strips to control bleeds and leaks at the surgical site. The arthroscopic tool may allow for the closure of the wound, cauterization of internal bleeding site, suturing of an internal rip or leak, among others. The surgical tool may also be used to take a tissue sample for further analysis to early detect any further complication within the internal site, such as tissue necrosis, infection, among others. The surgical tools assist medical professionals in interventional procedures such as drainage of the abscess and make it safer. In difficult situations, such as those that can be life threatening to the patient, the surgical tool allows undoable procedures to be done safely. In some instances, the patient may undergo additional surgery to address the complication, but early detection is key to better prognosis.

To aid in treating potential complications, the third tube 136 can also be used to deliver fluids to the internal site 112. The fluids can provide irrigation or medicine to the internal site. Suitable irrigation fluids include sterile saline solution, among others. Suitable medicines that can include, but are not limited to, antibiotics, antifungals, anti-inflammatory agents, chemotherapy, immunotherapy (e.g., antibodies), cellular therapies, or any other drug that can be administered locally, among others.

In addition to the medicine and fluids that can be delivered through the third tube, an optional fourth tube 142 can also assist in keeping the surgical drainage device sterile. The fourth tube 142 can be inserted into a fourth port 144. The fourth tube 142 can be configured to flush a saline solution through the tube.

Figure 6:
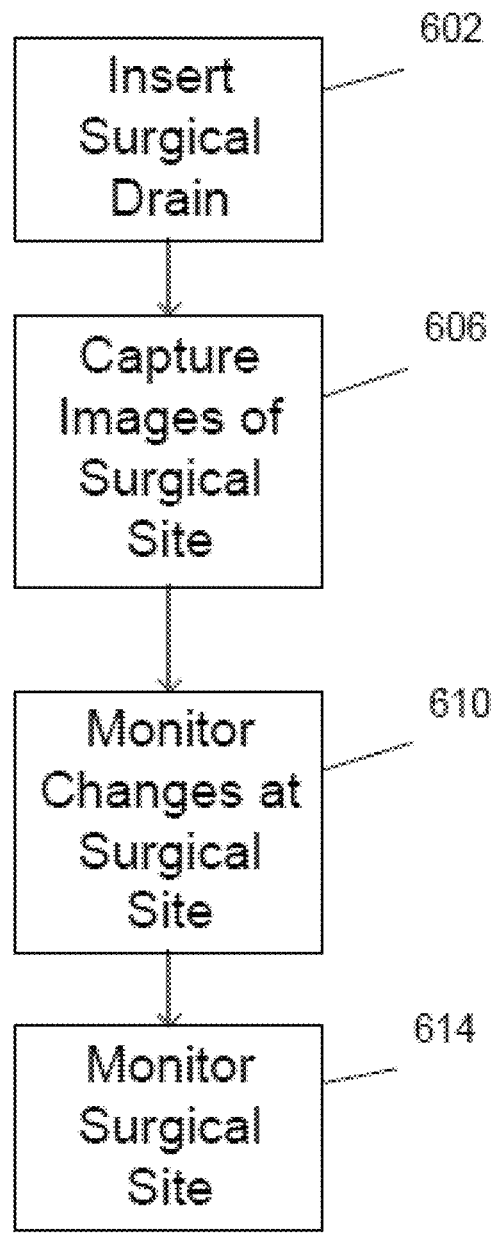
FIG. 6 illustrates a flowchart of the method of using the surgical drain device according to one embodiment.

In some embodiments, a method of monitoring a surgical site using the above described device 102 is provided, as shown in FIG. 6. The method according to some embodiments can incorporate inserting the surgical drain device into the body of a patient to monitor a surgical site. Generally, the method can include inserting the surgical device (step 602), capturing images at the surgical site (step 606), monitoring changes in the surgical site (step 610), and optionally monitoring the surgical site (step 614). In addition, once a change at the surgical site is identified, an optional additional step of treating the surgical site (step 616) can be performed. One or more of the above steps can be performed by the surgical device 102 and a medical professional monitoring the surgical site.

More specifically, at step 602, the device 102 can be inserted into the internal site 112. Inserting the device can include inserting it during the surgery for post-surgical care. The device can also be inserted through interventional radiology techniques by a medical professional. In some embodiments, the device 102 is inserted at the time a drainage system is inserted in a subject during or after surgery. In some instances, the patient is monitored in the hospital using the device 102. Often, the patient is sent home and the images from the device 102 are monitored remotely by a medical professional. In some cases, a nurse or caretaker monitors the device while the patient recovers. Whether the recovery takes place at home or in a medical facility, such as a hospital, the device allows for constant monitoring of the internal site.

At step 614, the method includes monitoring the surgical site or internal site 112 by capturing images form the camera 124 over time. At step 610, monitoring changes in the surgical site by comparing images taken with the camera. The images can be captured at even intervals after surgery of the surgical site, as shown in step 606. The images are taken by transilluminating the cavity and gently insufflating a balloon with saline and visualizing inner structures, as discussed above. Step 606 can further include inflating a balloon at the distal end 134 of the surgical drain device 102. Further, post-analysis of the images taken over time by the camera can be done via analytical software that can monitor changes in the images.

Monitoring the site, as mentioned above, can be used to provide treatment to any complications that are observed while monitoring the surgical site. For example, one of the ports can act as a suction port as part of the surgical device for inclusion of suction tubing for suctioning debris or fluid at the internal site. In other instances, the surgical device can also include a port for surgical tools to be inserted to the site. The tools can include those described above such as probes for the instillation of hemostatic material or placement of glue or clips.

In some examples, each internal tube is illuminated with a light source. In additional examples, the balloon is attached to a light source to illuminate the area. The balloon is able to be inflated to a suitable size and maneuvered internally in order to make space to adequately image the internal site. In some embodiments, one or more LED is added to the internal tube or balloon in order to allow for adequate room and light to image the internal site. The balloon can create the space internally, can easily be maneuvered within the space to reach the site of interest. In some examples, the camera is a pen or cell phone camera or a regular camera using in combination with high intensity illumination device, e.g., light, for example LED. The cameras used are relatively inexpensive in comparison to the standard cameras used for surgery which are normally standard fiber-optic channels and cameras.

Figure 7:
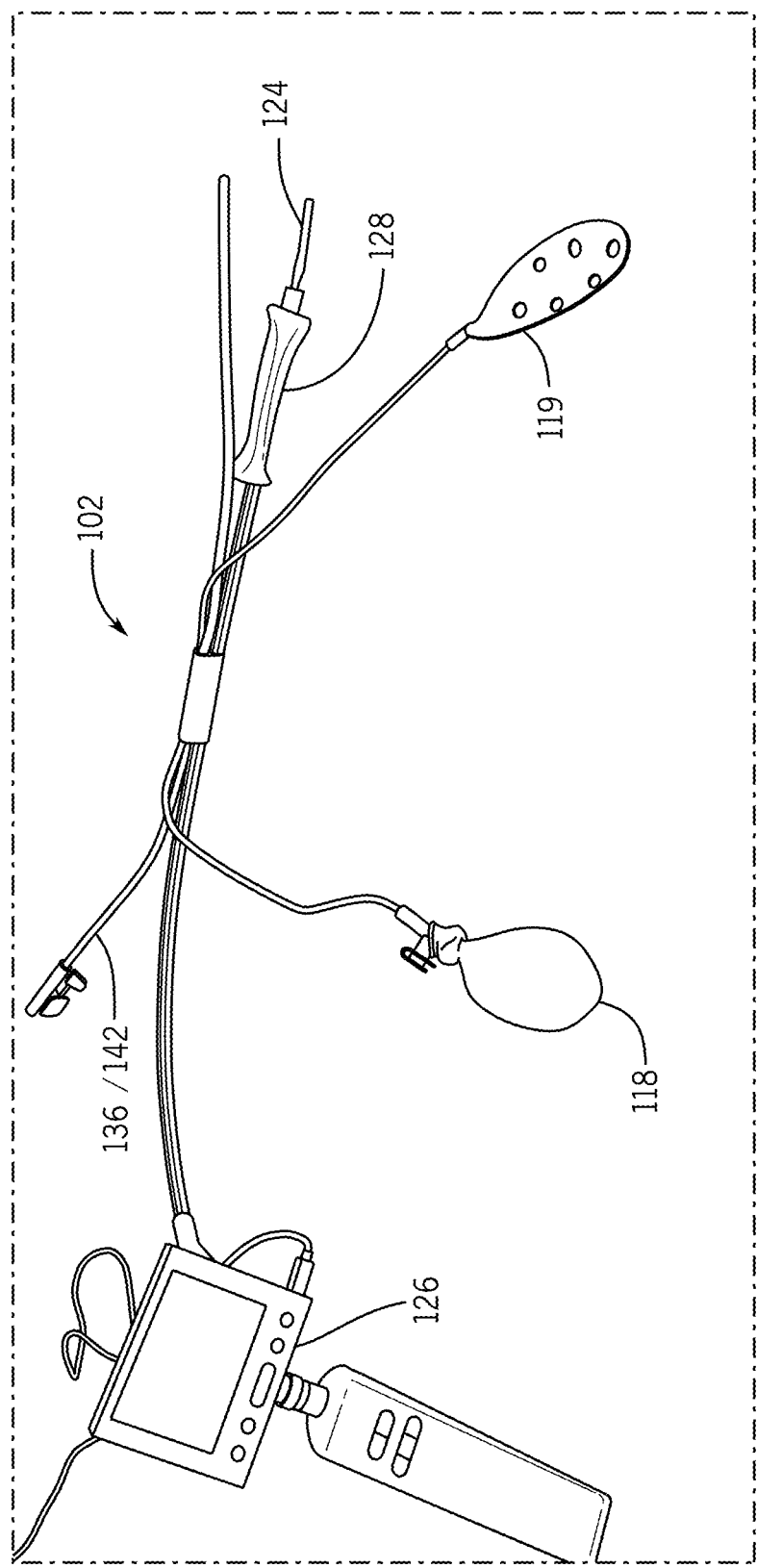
FIG. 7 illustrates a construction of the surgical drain device according to one embodiment.
Figure 8:
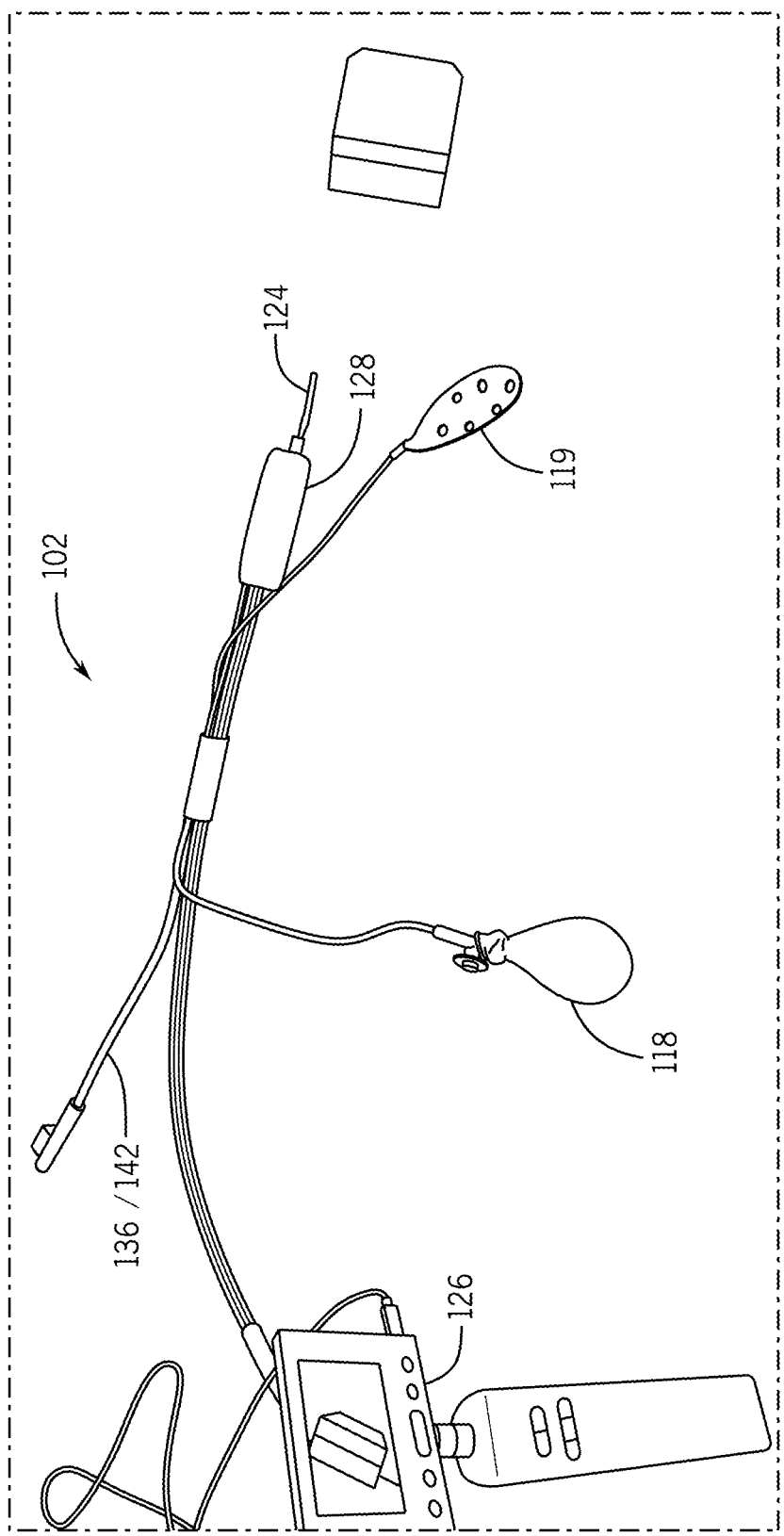
FIG. 8 illustrates a construction of the surgical drain device according to one embodiment, demonstrating the camera viewing an object.

FIG. 7 illustrates a construction of the surgical drain device 102 according to one embodiment. The device 102 may include one or more of: a collection device 118 (e.g. a drainage bag), which may be inserted into the first tube 114; a drainage catheter 119, which can be provided in various shapes such as a leaf shape (and which may be up to 12 inches in length, see FIG. 15); a camera 124 (e.g. connected to an adjustable, deflectable tip; the camera may have a 180° rotational range and 300,000 pixel resolution), which may be inserted into the second tube 120 and mounted within the balloon; a display 126 (e.g. a handheld display, e.g. with a screen size of 4-12 inches diagonally); a balloon 128 (e.g. a 300 mL balloon; the balloon in FIG. 7 is shown in a deflated state), which can be inflated with gas (e.g. air) or liquid (e.g. saline or water); and a third tube 136 or a fourth tube 142 (e.g. for providing flushing or for insertion of instruments). FIG. 8 illustrates a construction of the surgical drain device according to one embodiment, demonstrating the camera viewing an object (right side of image; note the object appearing on the screen of the handheld display 126).

Figure 9:
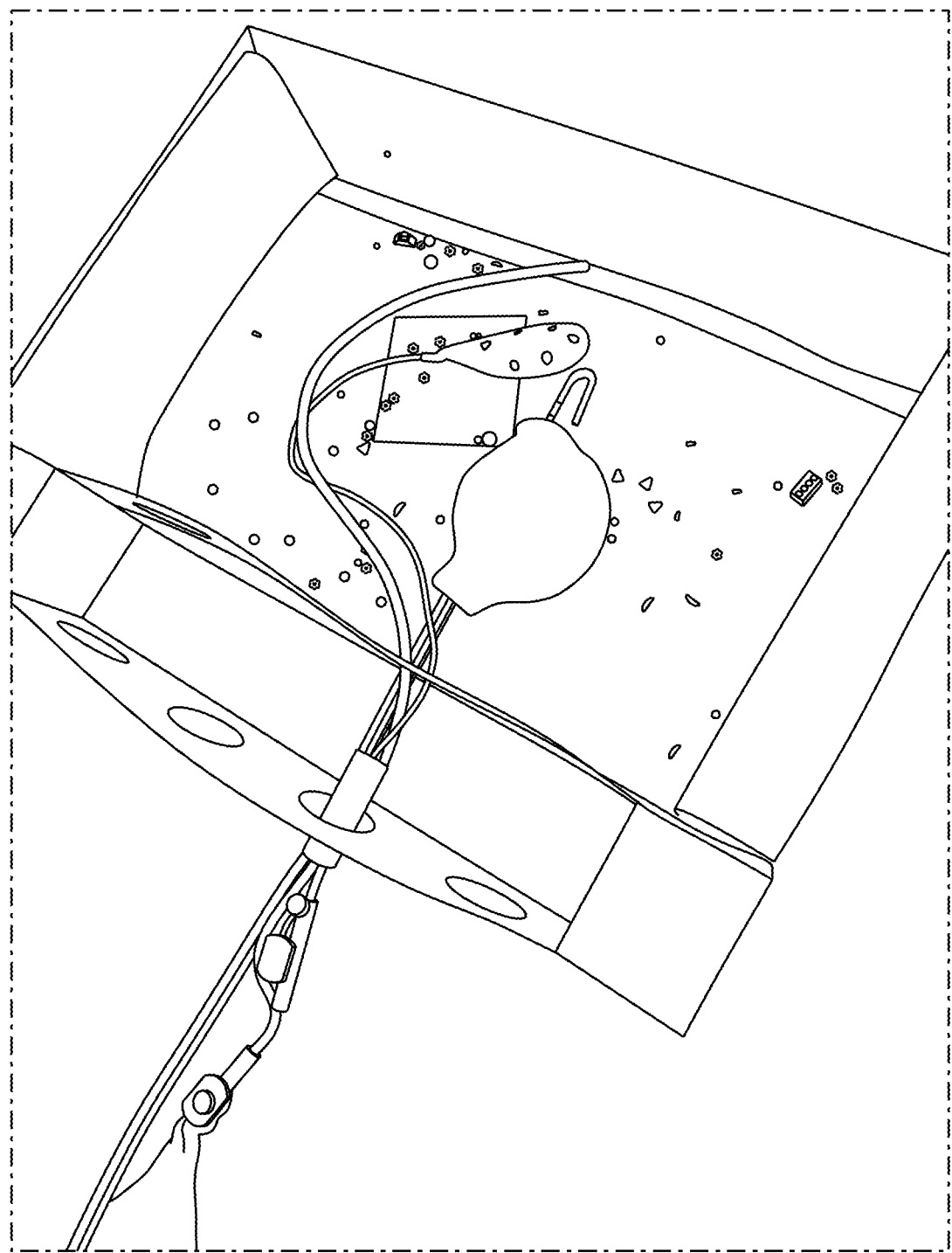
FIGS. 9-14 illustrate a construction of the surgical drain device according to one embodiment, demonstrating use of the device in a mockup of a sample.
Figure 10:
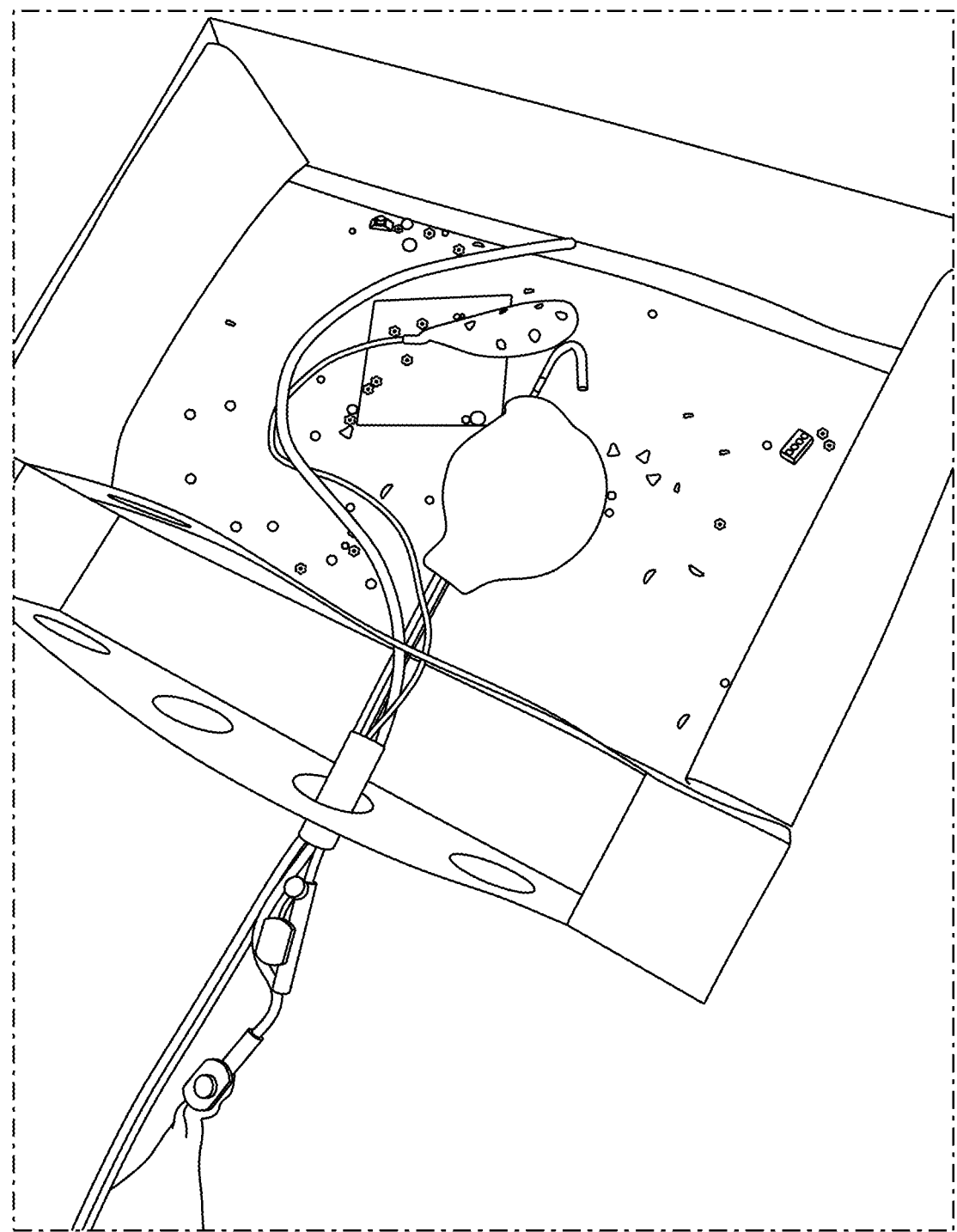
Figure 11:
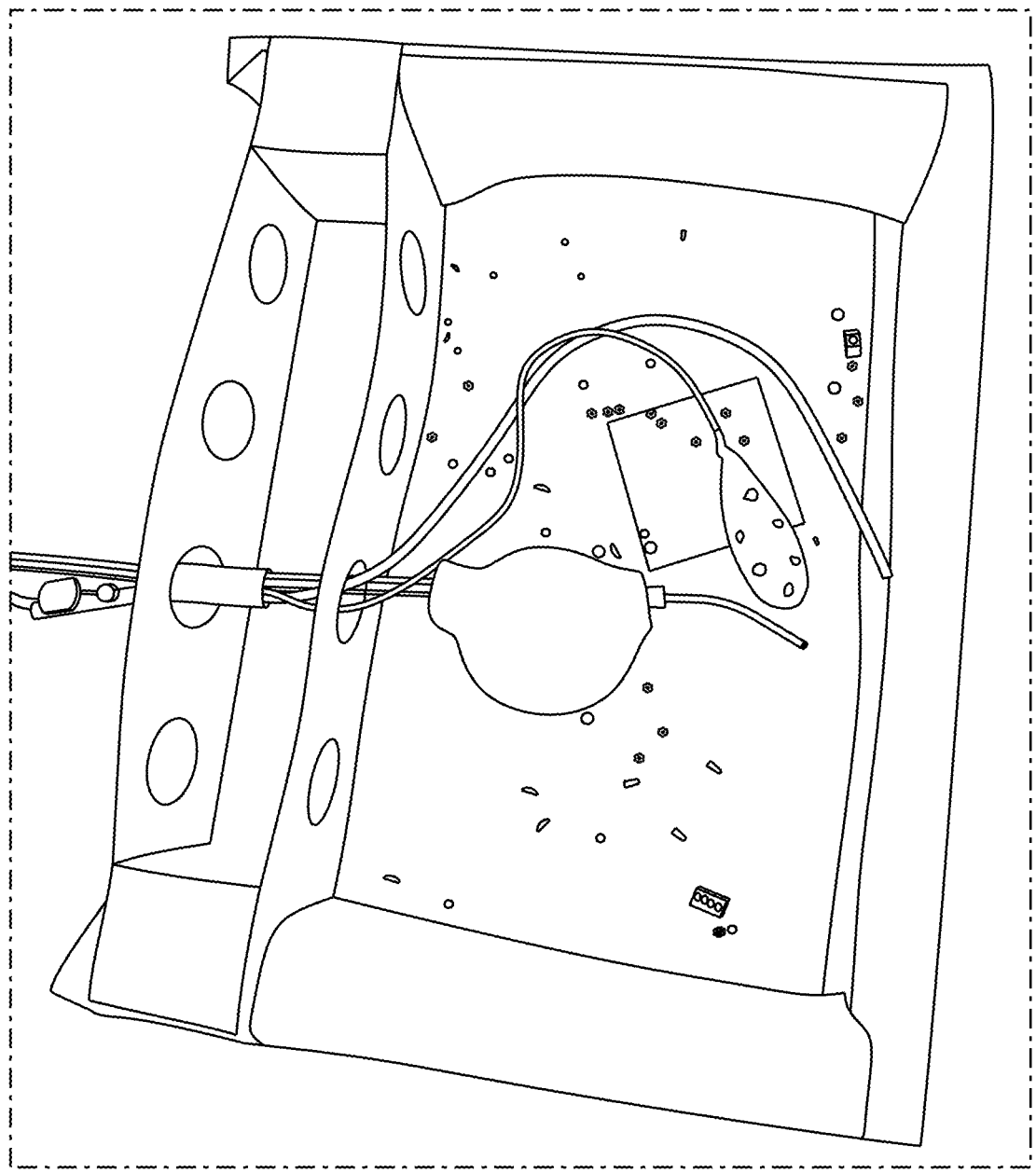
Figure 12:
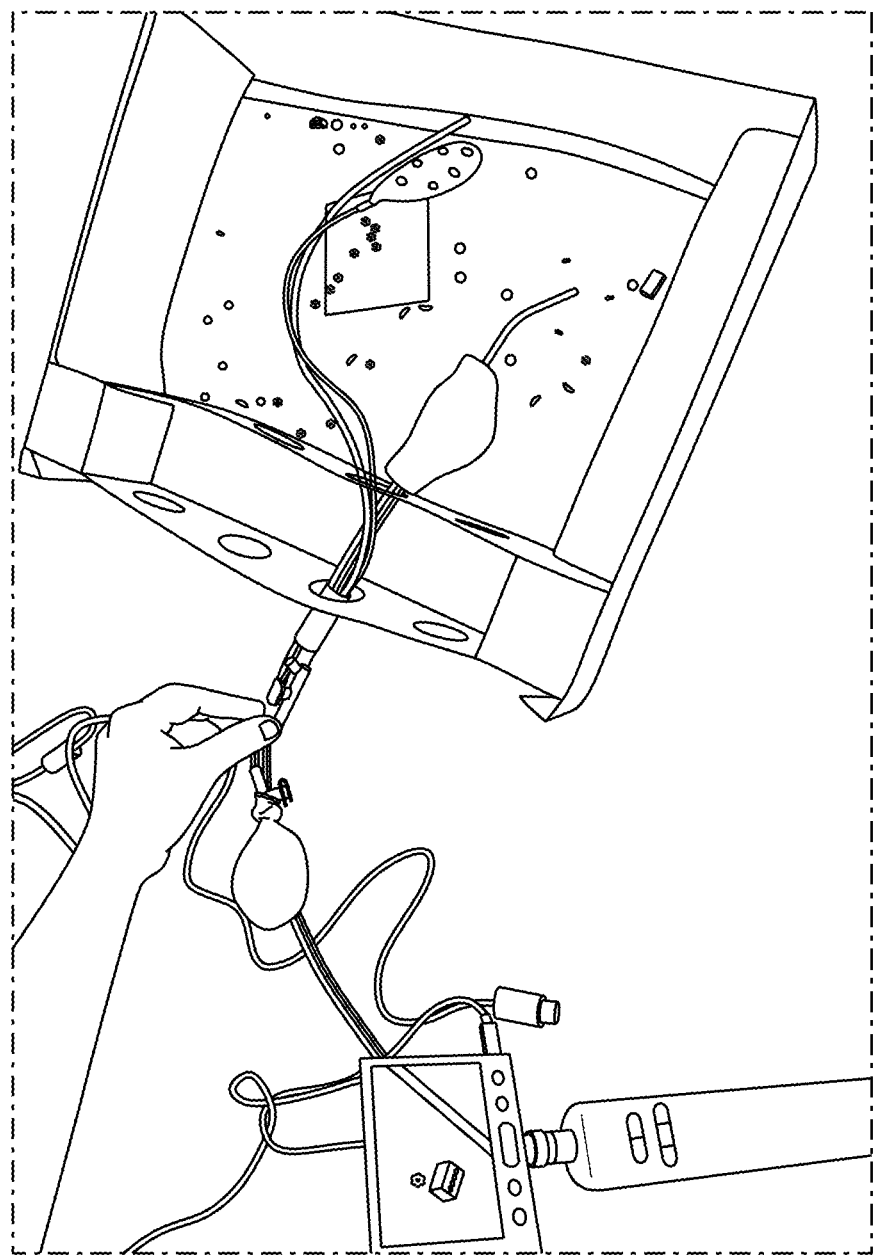
Figure 13:
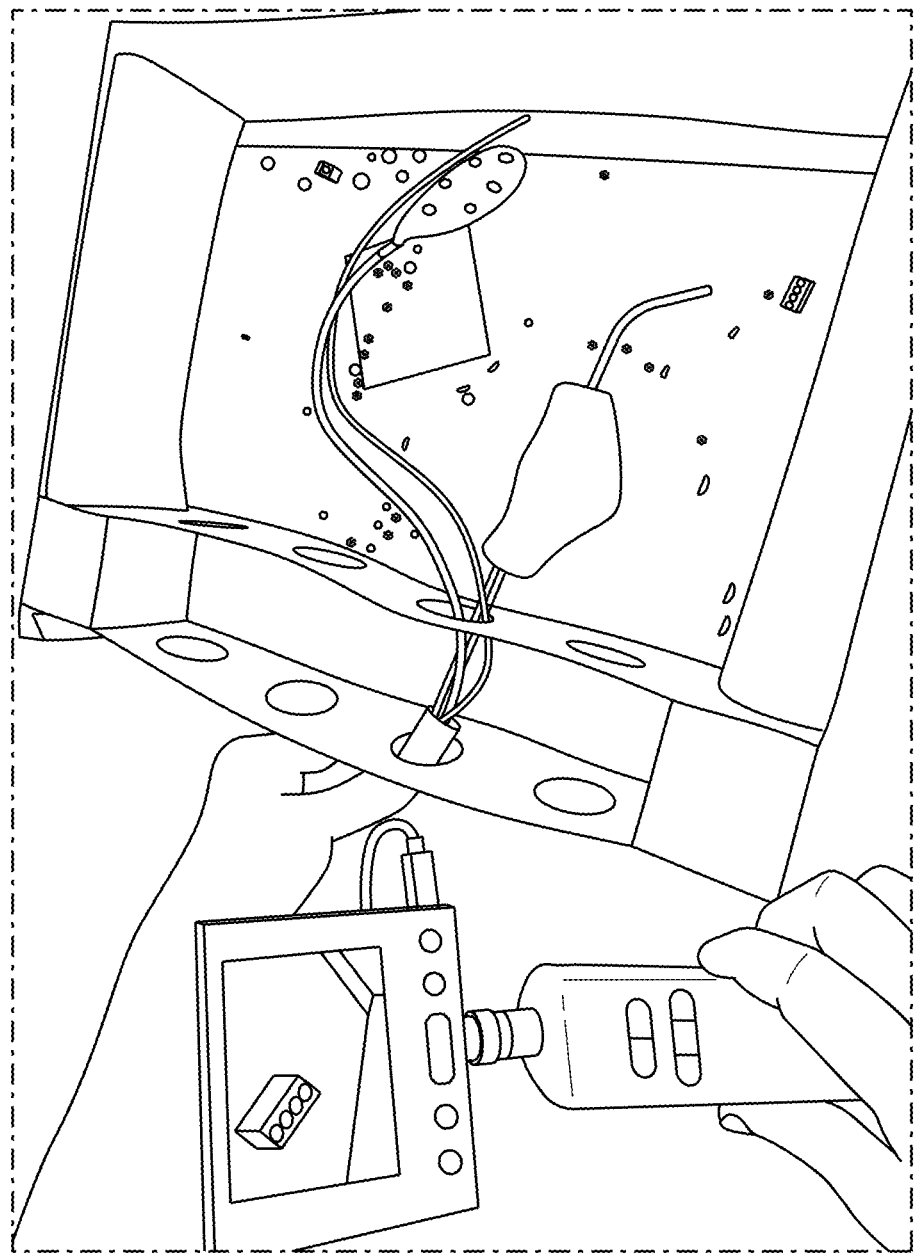
Figure 14:
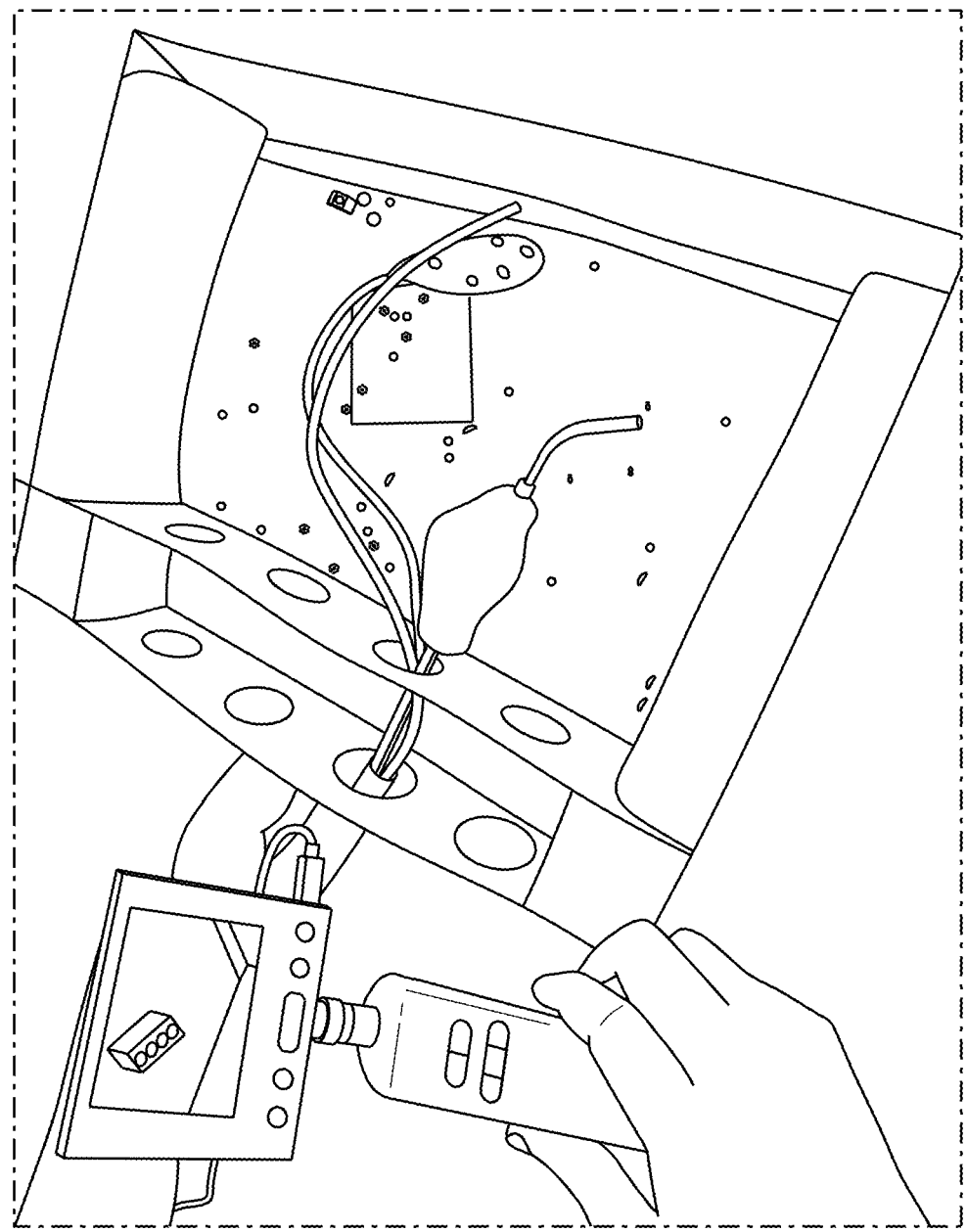

FIGS. 9-14 illustrate a construction of the surgical drain device according to one embodiment, demonstrating use of the device in a mockup of a sample. FIG. 9 shows the surgical drain device inserted into a sample, where a box has been fashioned to resemble a sample such as a GI space. In FIG. 9 the balloon is inflated, light is being emitted from the sources adjacent to the camera, and the tip of the camera probe is turned toward the balloon. Inside the sample space are small objects which represent structures within the sample. FIGS. 10 and 11 are similar to FIG. 9 except that the tip of the camera probe has moved so that it is no longer directly facing the balloon. FIGS. 12-14 illustrate use of the device 102 to explore the internal space of the sample (e.g. in the GI region of a subject), demonstrating how the device 102 can be moved and controlled remotely to explore the space and in particular how the tip of the camera probe can be manipulated to view in different directions within the sample.

Figure 15:
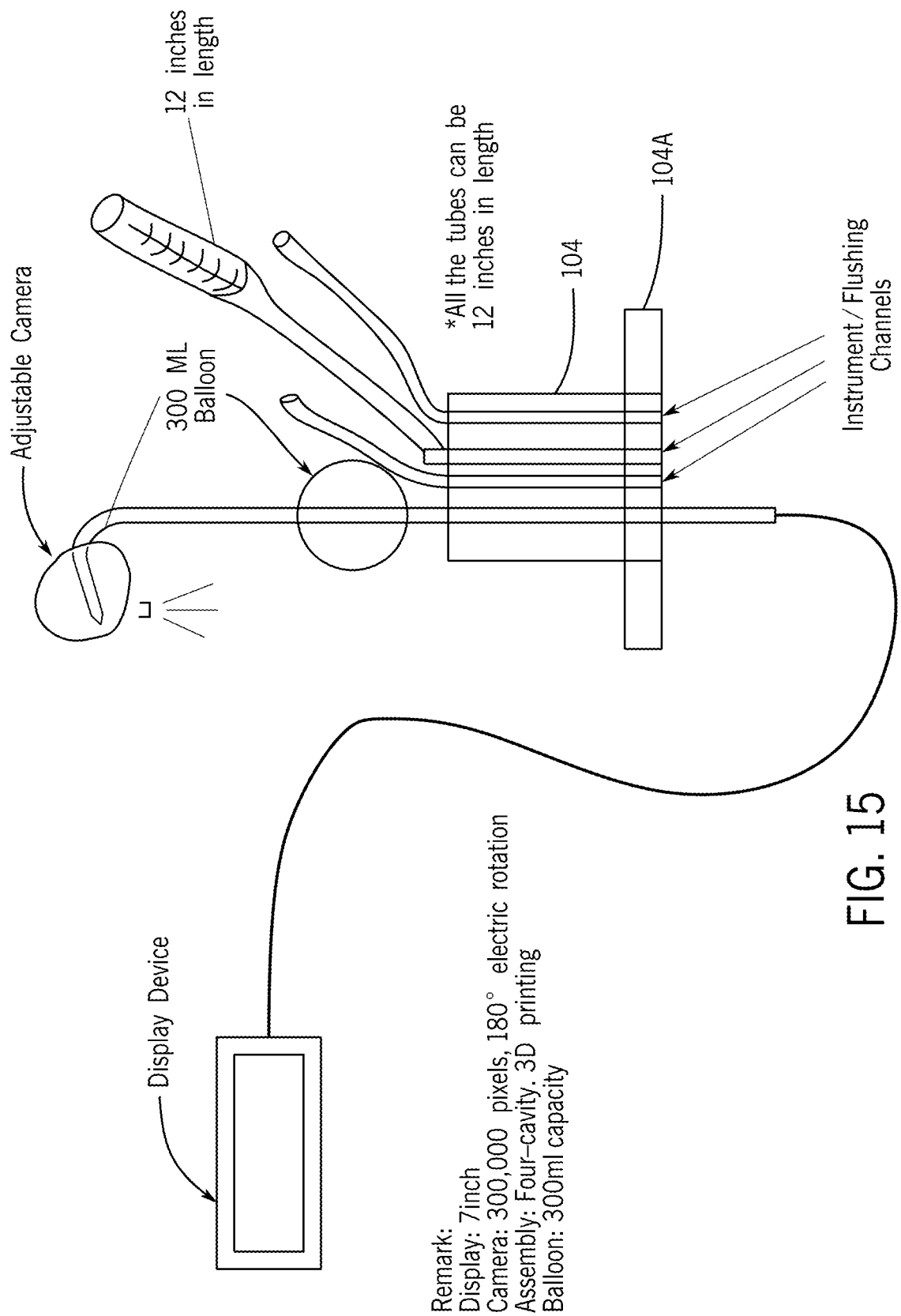
FIGS. 15 and 16 illustrate a construction of the surgical drain device according to one embodiment.
Figure 16:
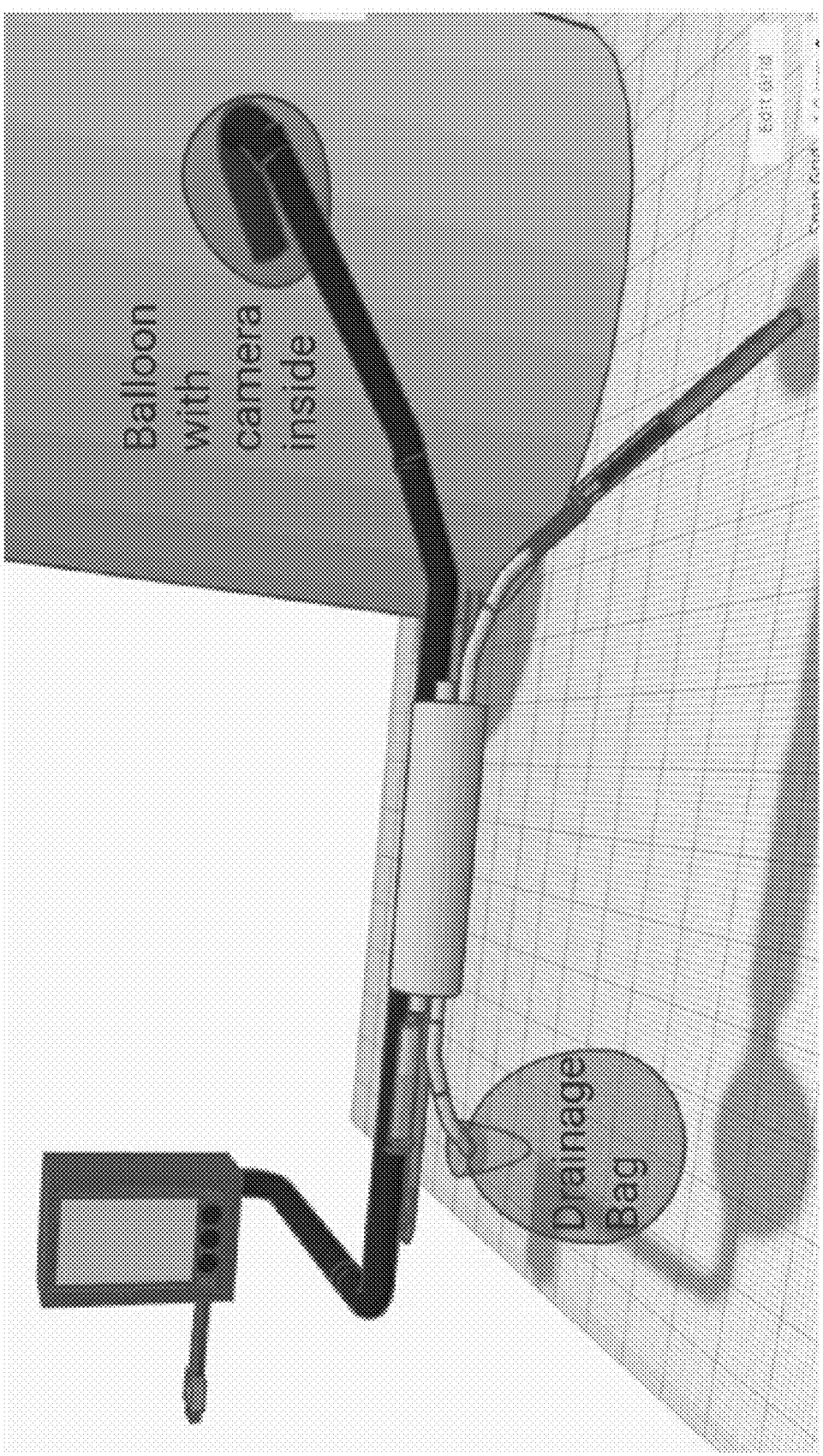

FIG. 15 illustrates another embodiment of the device 102. The outer flexible tube 104 has been enlarged in FIG. 15 to better depict the plurality of ports therein. The outer flexible tube 104 in this embodiment includes a flanged portion 104A at an end thereof; in certain embodiments the outer flexible tube 104 may be inserted into a subject (e.g. into an incision in the abdominal wall) and the flanged portion 104A may help stabilize the end of the outer flexible tube 104 within the incision and prevent the tube 104 from completely entering the abdominal cavity. Of the various ports in the outer flexible tube 104, one of the ports receives a camera attached to an adjustable probe having a balloon near the end and connected at the opposite end to the display device. Other ports may receive instruments, a collection device, and/or an irrigation tube, which can be inserted through the respective port. The outer flexible tube 104 may vary in length (e.g. between 1-10 inches) while any tubes or instruments inserted through the ports of the tube 104 would need to be long enough to extend through the port and into the space that is being investigated (e.g. the abdominal cavity). In certain embodiments, the outer flexible tube 104 may be made using 3D printing. FIG. 16 provides a perspective view diagram of an embodiment of the device 102.

FIG. 17 provides a cross-sectional diagram of an embodiment of the outer flexible tube 104, showing possible dimensions of each of the ports as well as an overall diameter of the tube 104, which in certain embodiments may be 17 mm or less, 15 mm or less, 12 mm or less, or 10 mm or less. An advantage of the tube 104 having a smaller diameter (e.g. 12 mm or less or 10 mm or less) is that the incision required for smaller diameter tubes can heal on its own without a need for sutures, clips, or other devices, which simplifies the recovery process. In certain embodiments, the instrument cavity may have a diameter of 3 mm or less; the suction pipe may have a diameter of 6 mm or less or 5 mm or less; the video cavity duct may have a diameter of 8 mm or less; and/or the clean cavity may have a diameter of 8 mm or less. In some embodiments the outer flexible tube 104 may have only three ports, for example omitting the clean cavity, in order to reduce the overall diameter of the tube 104 to 17 mm or less.

In use, a subject such as a patient following surgery may have the outer flexible tube 104 of the surgical drain 102 inserted near the surgical site (e.g. in the abdominal cavity wall), where the tube 104 may have two or more ports extending therethrough. The subject may have a collection device 118 tube inserted into one of the ports of the tube 104 to drain the surgical site. In addition, the subject may have a probe with a camera 124 and/or lights at the tip inserted into another one of the ports of the tube 104. Any other unused ports of the tube 104 may be plugged to prevent fluid loss and/or infection.

The collection device 118 and optional probe with the camera 124 may be left in the patient for an extended period of days to weeks (or in some cases for months) to permit an operator (e.g. a technician, nurse, doctor, or other clinician) to visually evaluate the surgical site within the subject during recovery and to identify and/or repair any tissue that has torn, ruptured, or failed to properly heal. When needed, the operator inflates the balloon to move tissue away (e.g. to displace one or more organs) and improve the field of view for the camera. If necessary, a flushing tube can be inserted into an additional port of the tube 104 to clean an internal site and/or an instrument can be inserted into a port of the tube 104 to repair any tissue as needed (e.g. using sutures, adhesives, clips, etc.). When the ports are no longer in use they may be plugged to prevent fluid loss from the subject and/or infection at the site.

The operator may use the surgical drain 102 primarily to help drain fluid from the site of surgery but will also have the option of viewing and/or repairing any portion of tissue if the subject develops complications such as pain, swelling, or bleeding. The fact that the surgical drain 102 is already inserted into the subject makes it easier for the operator to evaluate the subject and perform follow-up care without having to being the subject back into surgery, which saves money and reduces stress for the subject. While the primary use of the surgical drain 102 is expected to be within clinical settings (e.g. hospitals or related care facilities), it is also possible for the subject to be sent home with the outer flexible tube 104 embedded in their body (e.g. the abdominal wall) with a collection device 118 for drainage purposes. If the subject experiences pain or other post-operative difficulties they can return to the hospital, a clinic, their doctor's office, or other suitable facility to have a camera inserted into the tube 104 for inspection of the tissue and possible treatment to repair damaged or non-healing tissue.

Accordingly, the surgical drain 102 may be used for methods such as repairing a tissue or stopping bleeding at the internal site of the subject using the surgical tool, thereby reducing the time to intervention in a minimally invasive fashion. This tool will also allow seeing inside the subject to monitor physiologic functions such as return to peristalsis after surgery in a live fashion, and as a result will allow safer institution of diet in areas of abdominal surgery. It may have also a more significant role in oncology patients to enable the delivery of targeted medicine and radiation seeds to a locoregional area of pathology. It will allow visualization of internal changes in the body, such as bleeding and leakage of organs, and will enable interventions in a more expedited manner, whereas current technology uses clinical methods that can be unreliable and current technology such as CT scans can take a lot longer and may still give black and white still pictures as opposed to this technology which will provide live pictures in color. This technology will also have a role in trauma settings after initial screening to monitor things such as internal bleeding, which will make clinical decision making easier.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A surgical drain for monitoring an internal site in a patient comprising:
    an outer flexible tube comprising a plurality of ports disposed therein, each port of the plurality of ports extending from a proximal end of the outer flexible tube to a distal patient end of the outer flexible tube;
    a first tube disposed within and extending through a first port of the plurality of ports, the first tube having at least one lumen side extending therethrough in fluid communication with a collection device, the first tube being configured to drain fluid from the internal site in the patient to the collection device; and
    a second tube disposed within and extending through a second port of the plurality of ports, the second tube having a camera at the distal patient end of the second tube.

2. The surgical drain of claim 1, further comprising a third tube extending through a third port configured to transport a surgical tool or medicine to the distal patient end at the internal site of the patient.

3. The surgical drain of claim 2, wherein the surgical tool is configured to pass through the third tube and to repair a leak within the tissue area of the body.

4. The surgical drain of claim 2, wherein the surgical tool is arthroscopic tool.

5. The surgical drain of claim 1, wherein the camera is in communication with a display configured to depict an image from the camera.

6. The surgical drain of claim 1, wherein the camera is configured to perform real-time monitoring of the internal site of the patient.

7. The surgical drain of claim 1, wherein the second tube further includes a light source at a distal end of the second tube.

8. The surgical drain of claim 1, wherein the first tube and the second tube are flexible and elastically deformable.

9. The surgical drain of claim 1, wherein the first tube and the second tube are hollow tubes allowing fluid to flow within the first tube and air to flow within the second tube in order to inflate a balloon at the distal end of the second tube, wherein the second tube is configured to expand the balloon once near the internal site.

10. The surgical drain of claim 9, wherein the balloon is proximal to the camera on the second tube.

11. The surgical drain of claim 1, further comprising a fourth tube inserted into the fourth port of the plurality of ports, wherein the fourth tube is configured to flush a saline solution through the tube.

12. The surgical drain of claim 1, wherein the surgical drain is disposable after each use in a single patient.

13. The surgical drain of claim 1, wherein a third tube is used to deliver medicine to the internal site.

14. The surgical drain of claim 1, wherein the camera is configured to rotate at an angle relative to a central axis of the second tube.

15. A method of monitoring a surgical site comprising:
    (a) inserting the surgical drain of claim 1 into the internal site; and
    (b) monitoring the surgical site by capturing images from the camera over time.

16. The method of claim 15, wherein the method comprises:
    capturing images at even time intervals after surgery of the surgical site; and
    monitoring changes in the surgical site by comparing images from each of the time intervals.

17. The method of claim 15, wherein the method comprises inserting the surgical drain during surgery.

18. The method of claim 15, wherein the method further comprises: inflating a balloon at the distal end of the surgical drain.

19. A method for inspection analysis for diagnostic purposes, and intervention in an anatomical cavity through a percutaneous access, including but not limited to a surgical site, comprising:
    inserting an outer flexible tube into a body of a subject, the outer flexible tube comprising a plurality of ports extending from a proximal end of the outer flexible tube to a distal end of the outer flexible tube;
    inserting a first tube into a first port of the plurality of ports, the first tube having at least one lumen side extending therethrough in fluid communication with a collection device, the first tube being configured to drain fluid from an internal site in the subject to the collection device; and
    inserting a second tube into a second port of the plurality of ports, a distal end of the second tube comprising a camera attached thereto.

20. The method of claim 19, wherein the distal end of the second tube further comprises at least one light source attached thereto adjacent to the camera.

21. The method of claim 20, further comprising inserting a third tube into a third port of the plurality of ports, wherein the third tube is configured to transport a surgical tool or a medicine to a distal patient end at the internal site of the subject.

\* \* \* \* \*